April 28, 1953     R. W. WAGNER     2,636,390
POWER TAKE-OFF
Filed May 6, 1949     3 Sheets-Sheet 1
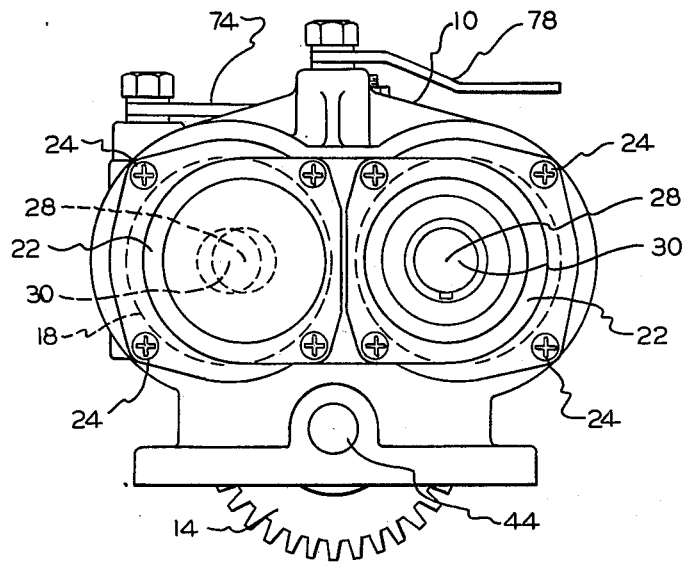
Fig. I.
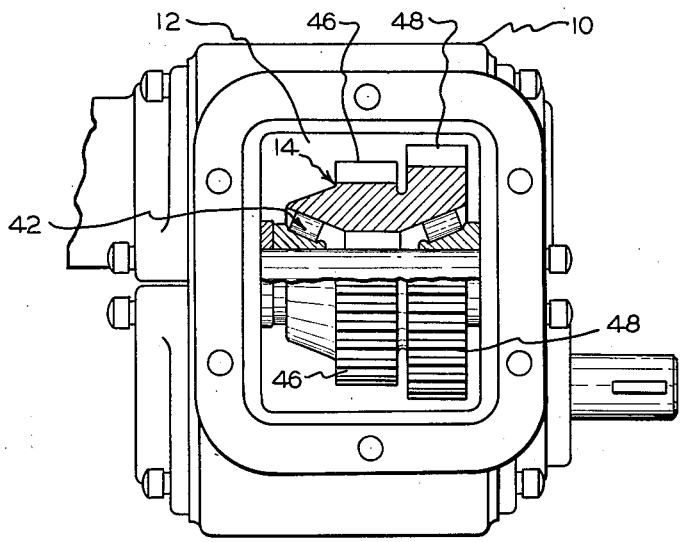
Fig. II.
Inventor
ROBERT W. WAGNER
By Beaumont Patch
Attorneys April 28, 1953  R. W. WAGNER  2,636,390
POWER TAKE-OFF
Filed May 6, 1949  3 Sheets-Sheet 2
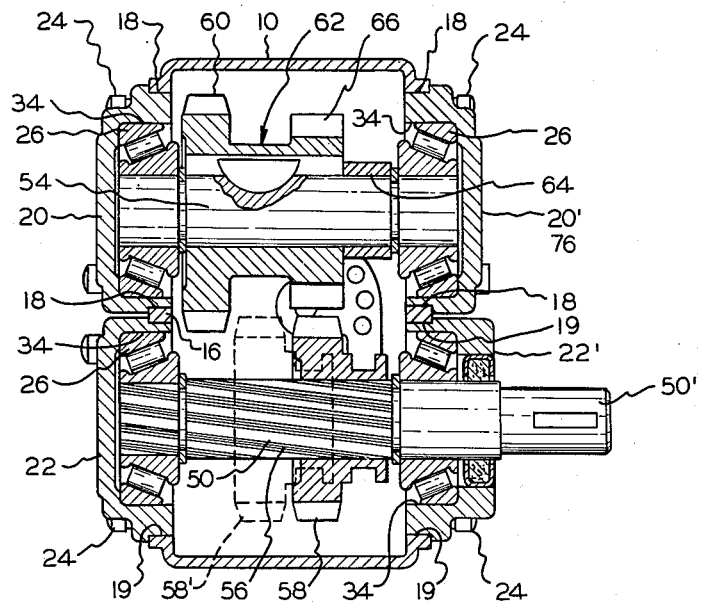
FIG. III
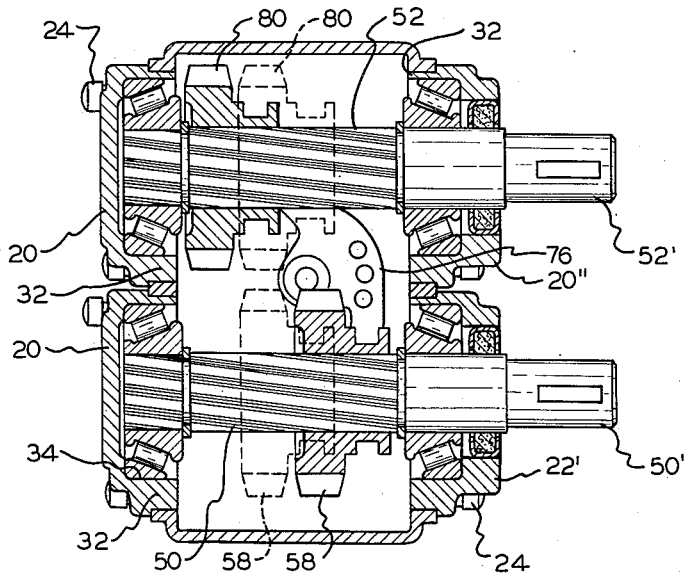
FIG. V
Inventor
ROBERT W. WAGNER
By Beaman Patch
attorneys

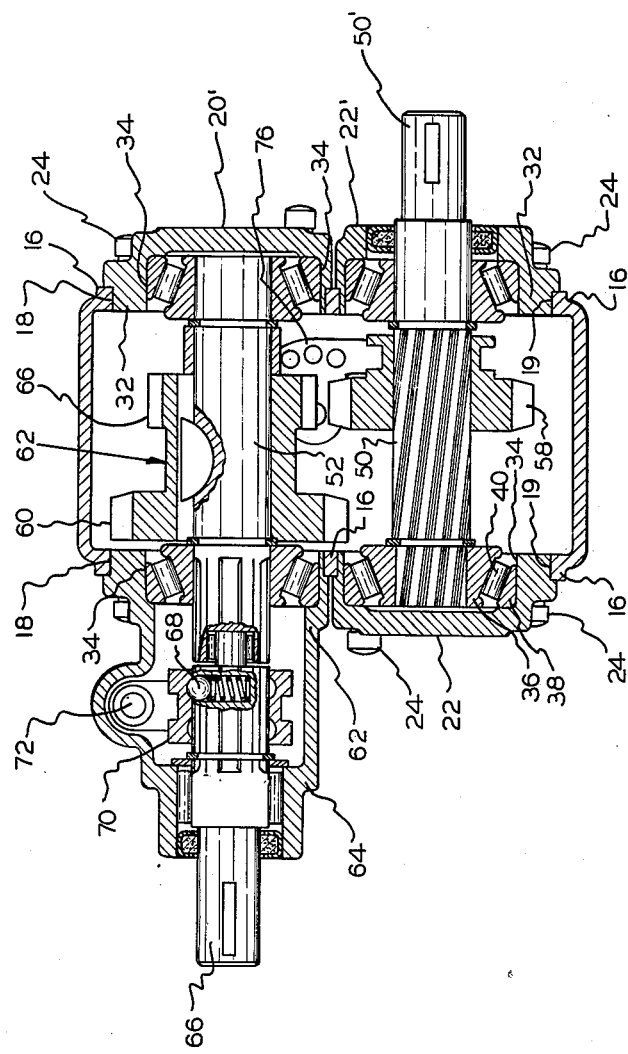

Patented Apr. 28, 1953

2,636,390

UNITED STATES PATENT OFFICE 2,636,390

POWER TAKE-OFF

Robert W. Wagner, Chelsea, Mich.

Application May 6, 1949, Serial No. 91,845

1 Claim. (Cl. 74—15.2)

This invention relates to power take-off units and refers more particularly to such as are designed for use in conjunction with the transmissions of motor vehicles, such as trucks, tractors and the like.

With modern trends in design, reversion to a helical gearing for power take-off units is indicated as desirable, together with the ability to make-up the units from standardized parts while providing, however, a variety of operating possibilities, which include, in particular, provision for a dual take-off condition and for reversibility, as to the direction of rotation of at least one take-off shaft.

An object of the present invention, therefore, is to provide a power take-off unit with a novel casing and shaft bearing mounting, which latter is capable of ready adjustment to adapt the unit for the assembly of alternative gear rings and shaft assemblies to yield the following alternative and preselected combinations:

(1) a power take-off unit assembled to provide a single power take-off shaft, the direction of rotation of which can be reversed at will, (2) a power take-off unit assembled to provide two power take-off shafts with the direction of rotation of one shaft reversible at will, (3) a power take-off unit assembled to provide two power take-off shafts but without any provision for reversal.

The present invention provides for the obtaining of the above combinations with the use of standardized parts and the same casing and this in a highly efficient and advantageous manner.

Further objects and advantages, and novel details of construction, will become apparent from a consideration of the following description with reference to the following drawings in which:

Fig. I is a side elevational view of a power take-off unit in accordance with my invention, Fig. II is an underneath plan view of Fig. III, Fig. III is a cross-sectional plan on the line A—A of Fig. I and with the gearing of the take-off unit assembled to give a forward or reverse driving condition, Fig. IV is a similar view to Fig. III, but showing the take-off unit fitted with a modified end cap and adapted to give two sources of power take-off, i. e. the unit is here equipped with two power take-off shafts, and Fig. V is a similar view to Fig. III showing the take-off unit fitted with two similar take-off shafts so that both can be employed to provide a source of power take-off, but without any reverse rotation, the upper power take-off shaft being here shown fitted with a single axially adjustable gear ring and the upper end caps containing the corresponding eccentric shaft bearings being shown turned through 180°, compared with Fig. III, to permit the upper and lower gear rings to be maintained clear of one another when adjusted to the neutral position.

Referring to the drawings, 10 indicates the power take-off casing which has a bottom opening 12 through which the driving gear cluster of the power take-off gearing, and indicated generally at 12 in Figs. I and II, projects, to position it for meshing with the main gear transmission, as for example, the transmission gearing of a motor vehicle when the casing is fixed in position upon the vehicle.

The casing also has opposed end walls 16 having axially aligned bores 18, 18' and 19, 19' in which eccentric end caps 20, 20' and 22, 22' (Fig. III) are telescopically mounted and secured, as by screw studs 24, each of which eccentric end caps carries a bearing, indicated generally at 26, the centre 28 of which (Fig. I) is offset from the centre 30 of its respective bore.

To provide for the selective assembling of the power take-off gear components, different end caps are employed but each end cap has a boss portion 32 adapted to telescope into one of the casing bores 18 or 19 and which boss provides an interior eccentric bore 34 for accommodating one of the shaft bearings. Thus the end caps have a common construction, as to the boss 32 and eccentric bearing bore 34, although the end caps may differ constructionally, otherwise, and as will be further explained.

Each bearing 26 comprises an outer race ring 36, an inner concentric race ring 38 and the bearing elements 40.

The driving gear cluster 14 is mounted upon a bearing, indicated generally at 42, upon a shaft 44 (Fig. I) journalled in the opposed casing walls and includes adjacent gear rings 46 and 48 of which the gear ring 48 is adapted to be constantly in mesh with, and driven by, one of the transmission gears of the main vehicle transmission. The arrangement permits the gear ring 48 to be optionally a helical or spur gear, depending upon the nature of the transmission gearing, and enables the power take-off gearing, including the gear ring 46, to be of helical or spur form, as required.

Also journalled in the opposed casing walls 16, are the two power take-off drive shafts, which include a common shaft 50 for the three assemblies according to Figs. III, IV and V and either a duplicate such shaft 52 (Figs. IV and V) or a somewhat different shaft 54 (Fig. III).

Referring first to the assembly according to Fig. III, the one shaft 50 is shown mounted in the bearings 26 mounted upon the end caps 22, 22' while the other shaft 54 is shown mounted upon the bearings 26 on the end caps 20, 20'. The shaft 50 has a helical splined portion 56 upon which a gear ring 58 is mounted for axial sliding movement for engagement either with gear ring 46 (this being the position of gear ring 58 in Fig. III) or with a gear ring 60 on a cluster gear ring assembly, indicated generally at 62, and mounted upon the shaft 54. This cluster gear ring, however, is assembled against axial movement upon its shaft, due to the presence of the spacer ring 64, but it carries a second gear ring 66 which is constantly in mesh with gear ring 46 of the driving cluster 14. The arrangement is such that the gear ring 58 can be selectively engaged with either gear ring 46 or with gear ring 60, or can be adjusted to neutral position as indicated in dotted lines at 58'. When adjusted as shown in Fig. III, the unit is connected for driving from gear ring 46 onto gear ring 66 as well as from gear ring 46 onto gear ring 58. This results in shaft 50 being driven in the same direction as shaft 54. When adjusted to connect gear ring 58 with gear ring 60, however, the drive is from 46 onto 66 and from 60 onto 58, with the shaft 50 accordingly driven in reverse direction and, due to the increased size of the gear ring 60, at increased speed.

The shaft 50 is formed with an end extension 50' and is assembled in conjunction with end cap 22', which latter is apertured for the passage of the shaft extension 50' to the outside of the casing 10, whereby this shaft 50 can be employed to provide a source of power take-off in the customary and well-known manner.

Referring now to Fig. IV, the same gear casing is shown assembled with an alternatively employable end cap 62 and shaft 52, in place of shaft 54. This end cap provides a tubular extension 64 rotatably housing a shaft extension 66 selectively clutchable to shaft 52, by the actuation of suitable selector clutch mechanism, to provide a second power take-off connection, additional to that afforded at 50'. Except for the replacement of the one end cap 20 by the alternative end cap 62 and the replacement of this one shaft 54 by the alternative shaft 52, the construction, arrangement and operation of the parts is the same as with Fig. III and the same reference numerals have been employed to denote the same parts as appear in this latter figure. It follows, therefore, and should be readily understood from what has been described with reference to Fig. III, that with the gear parts assembled as shown in Fig. IV, the gear ring 58 can be selectively adjusted to drive either the shaft 50 or the shaft 52, that both these shafts are utilizable to provide a power take-off connection, and that when so connected the one shaft 52 is driven in reverse direction and at increased speed compared with the connection of shaft 50. Neither the selector clutch mechanism for the take-off extension 66, and indicated generally at 68, 70, 72 and 74 in Figs. I and IV, nor the selector mechanism for the gear ring 58, and indicated generally at 76 and 78, forms a part of the present invention since obviously there are a variety of mechanisms which can be employed for this purpose and will be suggested as suitable to those skilled in the art. Consequently, detail illustration and description of such mechanisms is considered unnecessary.

Turning now to Fig. V, here the unit is assembled to provide two take-off connections, without the reverse and increased rotation features of the previously described assemblies but with the employment of the same casing 10, a pair of identical shafts 50, 52, and a second apertured end cap 20'' in place of the plain end cap 20'. Also, the gear cluster 62 is replaced by a single gear ring 80 similar to gear ring 58 and axially adjustable upon its shaft 52, in like manner, but in reverse sense, to the gear ring 58. Such assembly is possible due to the eccentric form of the end cap bosses 32 since the employment of the axially adjustable gear ring 80, similar to gear ring 58, requires that these gear rings should be positioned so that they do not mesh with each other as they are moved past each other in the selective engagement thereof with the gear ring 46 and this is rendered possible simply by turning the end caps 20, 20'' through 180° compared with the position of the end caps 20, 20'. In Fig. V, the shaft 52 is shown with the end extension 52' which, with shaft end extension 50' provides two alternatively employable take-off connections. Also, in this figure the gear ring 58 is shown in position where it is driven by gear ring 46 (Fig. II) so that the take-off connection at 50' is now available for use. To bring the other take-off connection 52' into use, the selector mechanism 76 is adjusted to shift the gear ring 58 to the left at the same time as the gear ring 80 is shifted to the right into engagement with gear ring 46. It should be appreciated, therefore, that I have provided a very compact construction of power take-off unit which enables the latter to be assembled to meet the different operating combinations above described in a ready and efficient manner. The eccentric end caps can be readily dismantled and reversed in position simply by removing the screw studs 24 and assembling is thus a relatively simple operation.

Having thus described my invention in essential detail and principle, what I claim as novel and wish to secure by Letters Patent is:

Power take-off apparatus comprising in combination, hollow casing structure having opposed side walls with two pairs of similar size opposed openings in said side walls, similar cap elements for said openings, each said cap element having a cylindrical flange extending from a closed end wall and defining with the said end wall a hollow interior open at the end of the flange remote from said end wall, said flange having a continuous cylindrical interior surface and a stepped exterior surface defining a reduced cylindrical surface at said remote flange end and an enlarged cylindrical surface adjacent the said end wall and an intervening radial shoulder, said reduced cylindrical surface having a bearing fit in a said opening and being eccentric with respect to said interior flange surface, said radial shoulder having abutment around the said opening and against the exterior of the casing wall, a pair of gear shafts with gears thereon located in said casing structure to form the power take-off gear train, and a concentric bearing ring assembly mounted within each said cap element and supporting said gear shafts in parallel relationship between the opposed pairs of casing wall openings, said bearing ring assemblies supporting said shafts concentrically with respect to said inner cap flange surfaces and said cap elements being rotatable within said end wall openings to vary the position of said shafts within the casing and hence the engagement of the gears of said gear train.

ROBERT W. WAGNER.

References Cited in the file of this patent
UNITED STATES PATENTS

| Number | Name | Date |
|---|---|---|
| 717,924 | Reid | Jan. 6, 1903 |
| 765,707 | Mathieu | July 26, 1904 |
| 1,799,100 | Keil | Mar. 31, 1931 |
| 2,254,499 | Seelinger | Sept. 2, 1941 |
| 2,335,606 | Pelphrey | Nov. 30, 1943 |
| 2,382,846 | Barber | Aug. 14, 1945 |